United States Patent [19]

Cenci et al.

[11] 4,138,541
[45] Feb. 6, 1979

[54] SELF-CURING COPOLYMERS CONTAINING BOTH HYDROXYAMIDE FUNCTIONS AND CARBOXY OR ANHYDRIDE FUNCTIONS, AND COMPOSITIONS

[75] Inventors: Harry J. Cenci, Warminster; Graham Swift, Bluebell, both of Pa.

[73] Assignee: Rohm and Haas Company, Philadelphia, Pa.

[21] Appl. No.: 713,081

[22] Filed: Aug. 9, 1976

Related U.S. Application Data

[63] Continuation-in-part of Ser. No. 454,645, Mar. 25, 1974, abandoned.

[51] Int. Cl.$^2$ .................... C08F 220/54; C08F 220/58
[52] U.S. Cl. ............................ 526/303; 260/29.6 TA; 260/31.2 N; 260/31.8 N; 260/32.6 N; 260/32.8 N; 260/33.2 R; 260/33.4 R; 260/33.6 UA; 428/461; 526/304

[58] Field of Search ................ 526/304; 260/29.6 TA, 260/31.2 N, 31.8 N, 32.6 N, 32.8 N, 33.2 R, 33.4 R, 33.6 UA

[56] References Cited

U.S. PATENT DOCUMENTS

| | | | |
|---|---|---|---|
| 3,531,525 | 9/1970 | Hoke et al. | 526/304 X |
| 3,585,172 | 6/1971 | Nishiyama et al. | 526/16 |
| 3,652,501 | 3/1972 | Albers et al. | 260/75 N |
| 3,714,096 | 1/1973 | Biale | 526/304 X |
| 3,947,528 | 3/1976 | Wingler et al. | 260/901 |

FOREIGN PATENT DOCUMENTS 1068037 5/1967 United Kingdom.
1309513 3/1973 United Kingdom.

Primary Examiner—John Kight, III

[57] ABSTRACT

β-Hydroxyalkylamide polymers are disclosed as self-curing by means of carboxy or anhydride functions in said polymers. The polymers are effective in solution, aqueous emulsion and powder coating formulations.

6 Claims, No Drawings

SELF-CURING COPOLYMERS CONTAINING BOTH HYDROXYAMIDE FUNCTIONS AND CARBOXY OR ANHYDRIDE FUNCTIONS, AND COMPOSITIONS

This is a continuation-in-part of Ser. No. 454,645, filed Mar. 25, 1974, the specification of which is incorporated herein by reference, and is related to other continuation-in-part applications thereof. The claimed subject matter is divided from that of Ser. No. 454,645, now abandoned, wherein a restriction requirement was made. The related applications are Ser. Nos. 686,004 now U.S. Pat. No. 4,076,917; 712,552; and 712,553 now U.S. Pat. No. 4,101,606 filed May 13, 1976, Aug. 9, 1976 and Aug. 9, 1976, respectively.

This invention relates to a novel method for curing or crosslinking polymers having carboxy or anhydride groups and β-hydroxyalkylamide groups, that is, self-curing polymers containing both carboxy and β-hydroxyalkylamide functionality.

Studies show that the β-hydroxyalkylamide functions employed in this invention provide efficient self-curing of carboxy or anhydride units contained in the same polymers, and can be employed without any catalyst being required. Furthermore, structural variations of the β-hydroxyalkylamides are relatively simple to achieve so that one can obtain optimum crosslinking efficiency.

The carboxy and anhydride containing polymers comprise for example polymerized residues of a β-hydroxyalkylamide monomer of the formula:

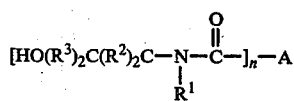

wherein A is an unsaturated alkyl radical which contains from 1–60 carbon atoms, such as an unsaturated radical containing one or more ethylenic groups [>C=C<] such as ethenyl, 1-methylethenyl, 3-butenyl-1,3-diyl, 2-propenyl-1,2-diyl, carboxy lower alkenyl, such as 3-carboxy-2-propenyl and the like, lower alkoxy carbonyl lower alkenyl such as 3-methoxycarbonyl-2-propenyl and the like; $R^1$ is hydrogen, lower alkyl of from 1–5 carbon atoms such as methyl, ethyl, n-propyl, n-butyl, sec-butyl, tert-butyl, pentyl and the like or hydroxy lower alkyl of from 1–5 carbon atoms such as hydroxyethyl, 3-hydroxypropyl, 2-hydroxypropyl, 4-hydroxybutyl, 3-hydroxybutyl, 2-hydroxy-2-methylpropyl, 5-hydroxypentyl, 4-hydroxypentyl, 3-hydroxypentyl, 2-hydroxypentyl and the isomers of pentyl; $R^2$ and $R^3$ are the same or different radicals selected from hydrogen, straight or branched chain lower alkyl of from 1–5 carbon atoms or one of the $R^2$ and one of the $R^3$ radicals may be joined to form, together with the carbon atoms, cycloalkyl such as cyclopentyl, cyclohexyl and the like; and $n$ is an integer having a value of 1 or 2.

Other hydroxyalkylamide monomers may be used as long as the resulting polymer contains units of the formula:

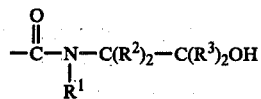

wherein $R^1$, $R^2$, and $R^3$ have the meanings given above. Preferably the formula is:

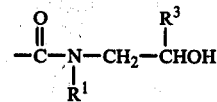

wherein $R^3$ is alkyl having 1–5 carbon atoms, preferably 1 carbon atom. Where $R^1$ is hydroxyalkyl, it is preferably the same as the hydroxyalkyl depicted. For instance, ethylenically unsaturated addition polymerizable monomers may be used which have the formula:

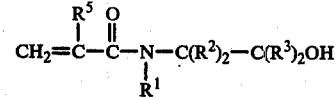

wherein $R^1$, $R^2$, and $R^3$ are as described above, and $R^5$ is —H or —CH$_3$. It is preferred that such monomers are copolymerized by addition polymerization in minor amounts of 1% to 50%, preferably 1% to 20%, of the total weight of ethylenically unsaturated monomers.

Suitable hydroxyamide monomers copolymerized with the carboxy- or anhydride-containing monomers are those of the foregoing formula I, wherein $R^1$ is H, lower alkyl, or HO(R$^3$)$_2$C(R$^2$)$_2$C—, $n$ is 2, A has 2–8 carbon atoms, each $R^2$ is H, and one of the $R^3$ radicals in each case is H and the other is H or a $C_1$–$C_5$ alkyl; that is,

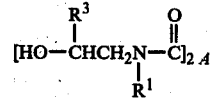

wherein A, $R^1$, $R^3$, and $n$ have the meanings just given. Examples of preferred compounds fall within the formula:

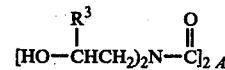

wherein $R^3$ is limited to H in both cases or —CH$_3$ in both cases. Specific examples of suitable monomers are bis[N,N-di(β-hydroxyethyl)] maleamide, bis[N,N-di(β-hydroxypropyl)] fumaramide, bis[N,N-di(β-hydroxyethyl)] citraconamide, bis[N,N-di(β-hydroxypropyl)] maleamide, and bis[N-methyl-N(β-hydroxyethyl)] mesaconamide. Such bis-amides can have, as the unsaturated moiety, the residue of various unsaturated polycarboxylic acids.

As exemplary of such polycarboxylic unsaturated aliphatic acids, their anhydrides or chlorides suitable for use in the preparation of the hydroxyamides to be employed in this invention, there may be mentioned the following: maleic acid, maleic anhydride, fumaric acid, itaconic acid, itaconic anhydride, citraconic acid, glutaconic anhydride, dimethyl citraconic acid, dimethyl mesaconic acid, dimethyl itaconic acid, dimethyl itaconic acid, mesaconic acid, hexene-(2)-dicarboxylic acid, hexene-(3)-dicarboxylic acid, α-methyl glutaconic acid (cis and trans), β-methyl glutaconic acid (cis and trans), ethyl maleic acid, ethyl fumaric acid, γ-methyl itaconic acid, α-methyl itaconic acid, dimethyl maleic acid, dimethyl fumaric acid, trans-ethyl mesaconic acid, γ-propyl itaconic acid, β-propyl glutaconic acid, γ-n-hexyl itaconic acid, fumaryl chloride, and mixtures of such acids. Preferred are maleic, fumaric, itaconic, glutaric, mesaconic, and citraconic acids.

The β-hydroxyalkylamides, (I, supra) are either known compounds or may be prepared by treating an ester of formula II (infra) with an amine of formula III (infra) at a temperature in the range of from about ambient up to about 200° C. Optionally, a catalyst may be employed, for example, potassium methoxide or butoxide and the like; quaternary ammonium alkoxides, such as tetramethylammonium methoxide and the like; alkali metal and quaternary ammonium hydroxides at an amount in the range of from 0.1 to 1.0 wt. % based on the weight of the ester. The reaction is preferably conducted at elevated temperatures. The following equation illustrates this process:

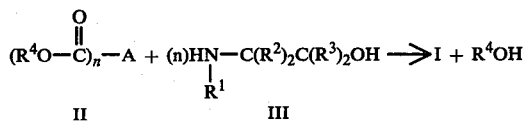

wherein A, $R^1$, $R^2$, $R^3$, and $n$ are as defined above and $R^4$ is lower alkyl of from 1-5 carbon atoms such as methyl, ethyl, propyl, n-butyl, tert-butyl, pentyl and the like.

The esters (II, supra) employed above are either known compounds or are prepared by esterifying the corresponding acid by standard esterifying procedures well-known to those skilled in the art.

When "A" is the residue of an unsaturated dicarboxylic acid, the acid chlorides or anhydrides can be used, as follows:

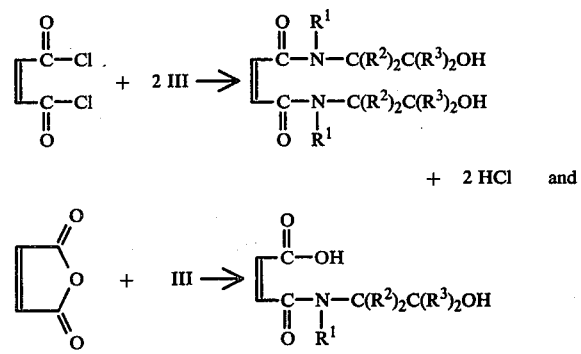

The latter is an example of a half amide.

Some representative examples of the amines falling within formula III which can be employed include 2-aminoethanol; 2-methylaminoethanol; 2-ethylaminoethanol; 2-n-propylaminoethanol; 2,2'-iminodiethanol; 2-aminopropanol; 2,2'-iminodiisopropanol; 2-aminocyclohexanol; 2-aminocyclopentanol; 2-aminomethyl-2-methylethanol; 2-n-butylaminoethanol; 2-methylamino-1,2-dimethylethanol; 2-amino-2-methyl-1-propanol; 2-amino-2-methyl-1,3-propanediol; 2-amino-2-ethyl-1,3-propanediol and 2-amino-2-hydroxymethyl-1,3-propanediol.

The curable polymer containing both carboxy or anhydride and β-hydroxyalkylamide units has such units present in the polymer at a ratio of from about 0.1 to about 2 parts of hydroxy functions per one part of carboxy, or to 0.5 parts of anhydride function, a 1:1 ratio of carboxy to hydroxy and a 0.5:1 ratio of anhydride to hydroxy function being preferred. Ratios outside of the above ranges may be employed but crosslinking efficiency is reduced. The self-cured polymer may, and commonly will, contain free carboxy or hydroxyl groups, or both. Solvents or liquids which may be employed as carriers for the curable polymer include aromatics, such as toluene, xylene and the like; aliphatics such as heptane, octane and the like; water, dimethylformamide, dimethylsulfoxide, halogenated solvents, ethers, ketones, esters, and alcohols. When films are cast or spray applied from aqueous systems, the pollution of the atmosphere which occurs when organic solvents are employed is eliminated. This advantage is important even when preparing powder coatings since no special precautions need be taken with regard to the aqueous solvent. To prepare powder coatings, aqueous formulations such as described for emulsion or solution polymers or solutions in organic solvents suitable for freeze drying, such as dioxane and benzene, or spray drying, e.g., toluene or methylene chloride, are employed and the powder coating isolated by freeze drying or spray drying.

The polymer is cured by heating at a temperature in the range of from 125° to about 400° C. and preferably in the range of from 125° to 175° C. for a period of time in the range of from about 0.5 to about 30 minutes. It is not necessary to employ a catalyst to effect curing.

This invention embraces all carboxy or anhydride containing addition copolymers. Examples of preferred monomers which can be incorporated into the polymer backbone and mutually crosslinked with the β-hydroxyalkylamide groups include unsaturated monocarboxylic acids such as acrylic acid, 4-penteneoic acid methacrylic acid, itaconic acid and the like, polycarboxylic olefinically unsaturated aliphatic acids such as those noted above, including maleic acid, 2-methylmaleic acid, itaconic acid, 2-methylitaconic acid, α,β-methyleneglutaric acid and the like, unsaturated anhydrides, such as maleic anhydride, itaconic anhydride, acrylic anhydride, methacrylic anhydride and the like, and half amides and half esters of dicarboxylic acids. Such carboxy or anhydride monomers together with the hydroxyamide monomers are usually used in a minor proportion in an addition copolymer of ethylenically unsaturated monomers, that is, together they amount of 1% to 50% by weight of the total monomers, preferably 1% to 20%.

Suitable monomers utilized in a major proportion, i.e., over 50%, to prepare the addition copolymer may be represented by the following formula:

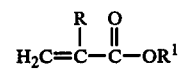

wherein R is H or alkyl having 1 to 4 carbon atoms and $R^1$ is the straight chain or branched chain radical of a primary or secondary alkanol, alkoxyalkanol or alkylthiaalkanol, the alkanol having from 1 to about 20 carbon atoms, examples being methyl, ethyl, methylpropyl, n-butyl, 2-ethylhexyl, heptyl, hexyl, octyl, propyl, 2-methylbutyl, 1-methylbutyl, butoxybutyl, 2-methylpentyl, methoxymethyl, ethoxyethyl, cyclohexyl, n-hexyl, isobutyl ethylthiaethyl, methylthiaethyl, ethylthiapropyl, n-octyl, 6-methylnonyl, decyl, dodecyl, and the like. Also useful are an amide-containing monomer such as acrylamide, methacrylamide, or the methylol or methoxymethylol derivatives thereof, or a hydroxyl-containing monomer such as hydroxyethyl or hydroxypropyl acrylate or methacrylate. The hydroxyl-containing and amide-containing monomers may be used together, or singly. Other conventional addition polymerizable ethylenically unsaturated monomers include styrene, vinyl toluene, vinyl acetate, butadiene, and so forth.

The polymers can be used as coatings, including general purpose industrial coatings, machinery and equipment coatings, especially metal coatings such as for cans, appliances, automobiles and the like. In addition, the initiator and monomer mix is added over 2.5 hours, while maintaining reflux and a nitrogen blanket. The first chaser catalyst is then added over 1 hour and held for ½ hour. The second chaser catalyst is then added over ¼ hour and held for one hour. The mixture is then cooled and the reaction terminated. Product Analysis: solids, 39.3 wt. %; conversion, 98.3%; viscosity at 25° C. is 350 cps. Cure: a dry 2 mil thick film of the above polymer baked at 400° F. for 30 minutes is insoluble in n-propyl acetate. A control polymer of the composition MMA/BA/MHEMAM//73.4/19.6/7.0 prepared in an identical manner and baked as described above is soluble in n-propyl acetate.

By following substantially the procedure described in Example 1 (A) above and by substituting different ratios of the monomer compositions, there are obtained other curable polymers. The following Table lists the compositions and results:

TABLE II

| Ex. No. | MMA | BA | MAA | MHEMAM | Solids (wt.%) | Visc. (cps.) | Conv.% |
|---|---|---|---|---|---|---|---|
| 1B | 59.2 | 27.2 | 5.0 | 3.3 | 39.4 | 210 | 98.5 |
| 1C | 66.7 | 20.0 | 5.0 | 8.3 | 39.4 | 365 | 98.5 |
| 1D | 60.0 | 20.0 | 7.5 | 12.5 | 38.2 | 450 | 95.5 | the polymers can be used in forming films, fibers, paints, lacquers, varnishes, seamless flooring, caulks or impregnants; as adhesives for both natural and synthetic materials such as paper textiles, wood, plastics, metal and leather; as binders for nonwoven fabrics; in the preparation of inks, and in all areas where epoxy and melamine finishes are presently employed.

The following examples depict presently known modes of carrying out the invention:

EXAMPLE 1A — Preparation of self-curing polymers containing polymerized methyl methacrylate, butyl acrylate methacrylic acid, and N-methyl-N-(β-hydroxyethyl) methacrylamide (MHEMAM)

A. Preparation of MMA/BA/MAA/MHEMAM//66.7/20/5.0/ 8.3 wt.%

| Charge | Grams |
|---|---|
| Initiator and Monomer Mix | |
| MMA | 667 |
| BA | 200 |
| MAA | 50 |
| MHEMAM | 83 |
| Toluene | 168.8 |
| n-propyl acetate | 168.8 |
| 2,2'-azobisisobutyronitrile (AIBN) | 7.5 |
| Heel Charge | |
| Toluene | 375 |
| n-propyl acetate | 375 |
| 1st Chaser | |
| Toluene | 168.8 |
| n-propyl acetate | 168.8 |
| AIBN | 0.75 |
| 2nd Chaser | |
| Toluene | 37.5 |
| n-propyl acetate | 37.5 |
| AIBN | 0.75 |

Procedure: The heel charge is added to a kettle fitted with stirrer, condenser, nitrogen inlet and addition funnel. The mixture is heated to reflux (100° C.) at reflux,

We claim:

1. A curable addition polymer containing (a) one or more carboxy groups, salts of said carboxy groups or carboxylic acid anhydride groups and (a) one or more pendant β-hydroxyalkyl amide groups of the formula:

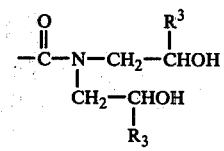

wherein $R^3$ is H or $CH_3$.

2. The composition of claim 1 in which the carboxy, salt or anhydride groups are the residues of at least one ethylenically unsaturated acid monomer selected from acrylic, methacrylic, maleic, or itaconic acids and maleic anhydride, the acid monomer and hydroxyamide monomer each being used in the copolymer in the amount of 1% to 20% by weight of the monomers in the copolymer, and the ratio of hydroxyamide functional groups to salt, carboxy, or anhydride functional groups is between about 0.5 and about 2, wherein one anhydride group is equal to two carboxy functions.

3. The composition of claim 1 contained in water or an organic liquid selected from aromatic and aliphatic hydrocarbons, dimethyl formamide, ethers, ketones, esters, and alcohols.

4. The method of curing the composition of claim 1 comprising the step of heating it at a temperature of from 125° C. to 400° C. until the polymer is cured.

5. The method of curing the composition of claim 2 comprising the step of heating it at a temperature of from 125° C. to 400° C. until the polymer is cured.

6. The method of curing the composition of claim 3 comprising the step of heating it at a temperature of from 125° C. to 400° C. until the polymer is cured.

* * * * *